Oct. 11, 1966  A. BURBIDGE ETAL  3,278,024
PRODUCE SIZER

Filed June 8, 1965  6 Sheets-Sheet 1

Oct. 11, 1966  A. BURBIDGE ETAL  3,278,024
PRODUCE SIZER

Filed June 8, 1965

Oct. 11, 1966   A. BURBIDGE ETAL   3,278,024
PRODUCE SIZER
Filed June 8, 1965   6 Sheets-Sheet 3

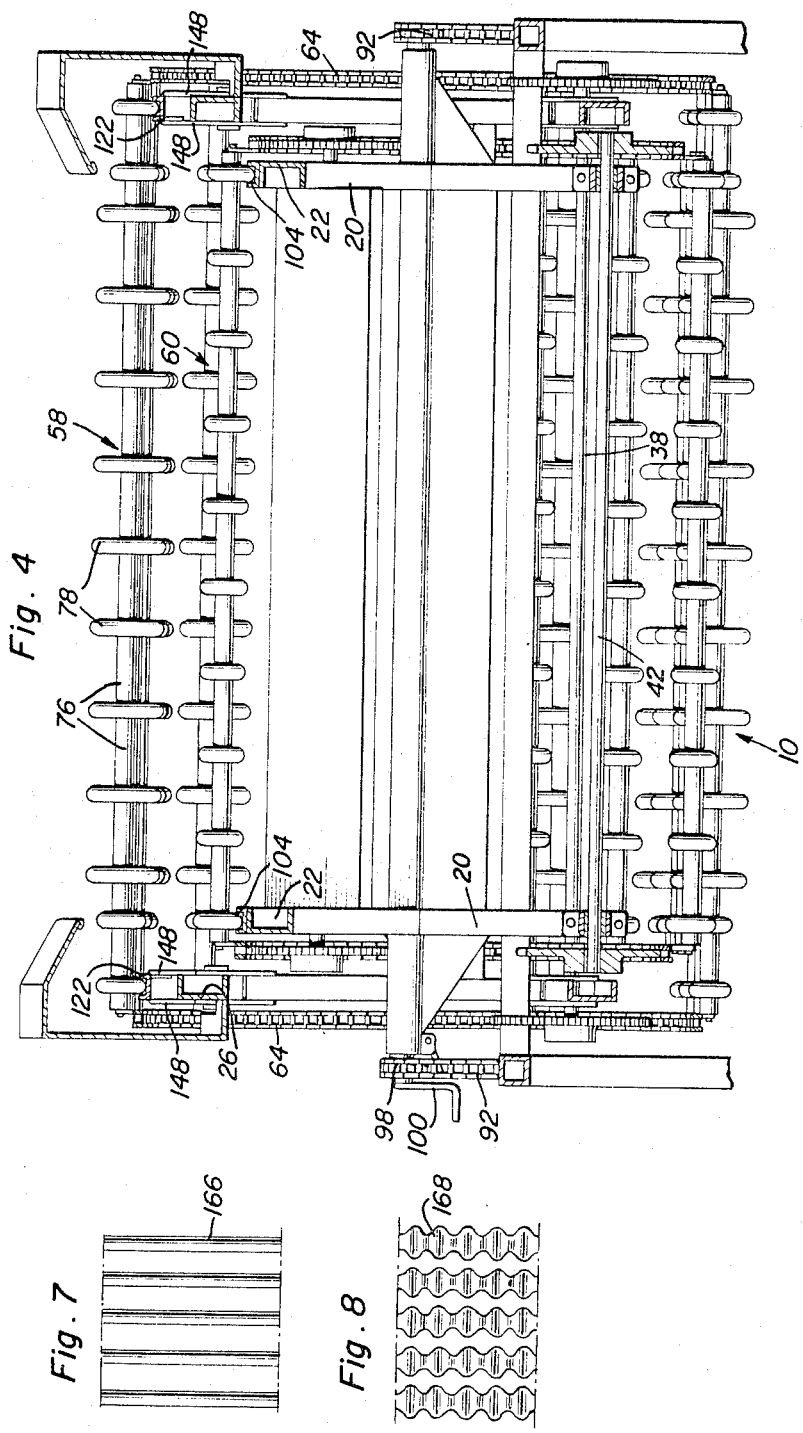

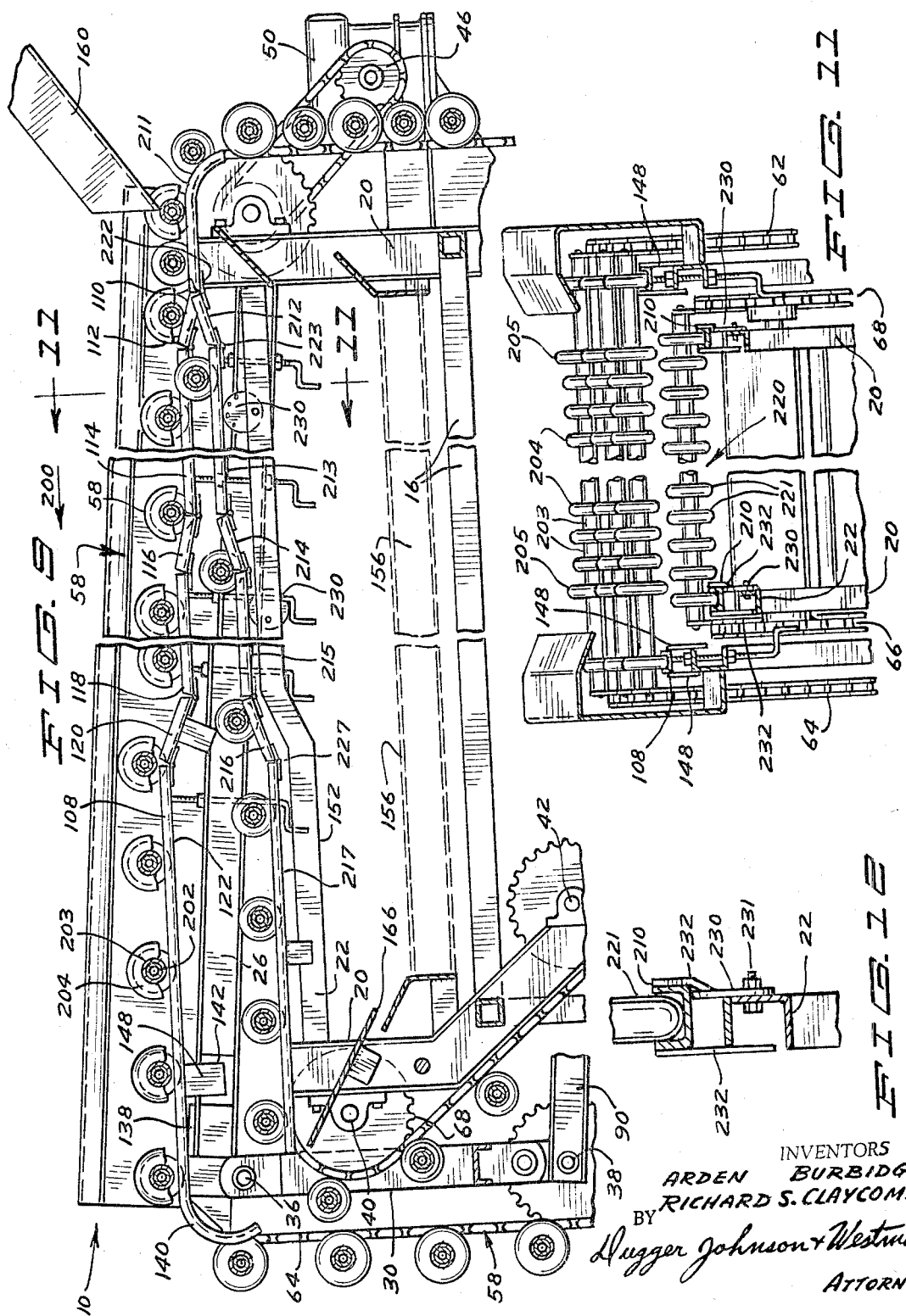

Oct. 11, 1966 A. BURBIDGE ETAL 3,278,024
PRODUCE SIZER
Filed June 3, 1965 6 Sheets-Sheet 6

INVENTORS
ARDEN BURBIDGE
RICHARD S. CLAYCOMB
BY Dugger Johnson & Westman
ATTORNEYS

United States Patent Office 3,278,024
Patented Oct. 11, 1966

3,278,024
PRODUCE SIZER
Arden Burbidge, P.O. Box 90, Park River, N. Dak., and Richard S. Claycomb, 2303 S. Washington, Grand Forks, N. Dak.
Filed June 8, 1965, Ser. No. 462,282
11 Claims. (Cl. 209—103)

This application is a continuation-in-part of our co-pending application for Produce Sizer, Serial No. 319,852, filed October 29, 1963 and now abandoned.

This invention relates to a novel and useful produce sizer and more specifically to an apparatus specifically adapted to continually size and separate produce according to size. The produce sizer of the instant invention includes a pair of conveyor assemblies with portions of each conveyor assembly disposed in a single generally horizontal run. Each of the conveyor assemblies includes a plurality of spaced transversely extending cross members. The cross members of each of the conveyor assemblies are interdigitated between adjacent ones of the cross members of the other conveyor assembly. The cross members of at least one conveyor assembly are mounted for vertical adjustment relative to the cross members of the other. In a second form of the invention both conveyor assemblies can be relatively vertically adjusted. In this manner, the spacing between adjacent cross members of the two conveyor assemblies increases gradually from a minimum to a maximum, as produce carried by the cross members of the conveyor assemblies moves from one end of the run toward the other end thereof. As the spacing between the cross members of the two conveyor assemblies gradually increases throughout the aforementioned run, the smallest, larger and largest articles of produce will consecutively fall through between adjacent ones of the cross members. By sizing produce in this manner a transversely extending elongated bagging conveyor including transversely spaced individual sizes of produce being discharged from the sizing conveyor. Then, the groups of individual sizes of produce may be readily bagged at the discharge end of the bagging conveyor.

When both of the upper reaches of the conveyor assemblies are vertically adjustable, the sizer is capable of more precise sizing. The upper and lower reaches travel parallel to each other along the machine and then diverge simultaneously to a new setting. When both the upper and lower reaches diverge, the change in size comes more abruptly, therefore resulting in a precise size gradient. Also the spacing of the cross members is more accurately controlled.

The main object of this invention is to provide a produce sizer including a pair of conveyor assemblies having a pair of interfitted generally horizontal reaches of alternate cross members and including means for selectively vertically adjusting the cross members of at least one of said conveyor assemblies.

A further object of this invention, in accordance with the immediately preceding object, is to provide novel means for varying the rate of increase of the vertical spacing between the cross members of the two conveyor assemblies.

Another object is to provide for diverging the cross members of the conveyors at the same point of travel to increase the vertical spacing thereof abruptly.

Still another object of this invention is to provide vertical spacing means for the adjustable cross members which may be adjusted so as to define a single planar reach or run along which the adjustable cross members will move; or a plurality of consecutive vertically spaced and/or variably inclined sectional planar reaches or runs along which the adjustable cross members of the adjustable conveyor may move. In this manner, a greater variance between the sizes of the articles of produce in each size grouping of produce may be maintained.

Another object of this invention is to provide a produce sizing machine that may be readily adjusted so as to be adapted to handle and properly size according to predetermined groupings of sizes various different types of produce.

A still further object is to provide a produce sizer having substantial capacity and means for at least twice "feeling" the size of even irregular shaped produce.

A further object of this invention is to provide a produce sizer which will be capable of handling dirty produce and which will be water and corrosion resistant.

Yet another object is to provide a compact sizer having a high capacity per square foot of plan area.

Another object is to provide a sizer which will be gentle when handling produce and which will be capable of accurately sizing produce in spite of random sizes and shapes of the produce handled.

A further object is to provide a produce sizer constituted in a manner enabling different size adjustment to the sizer over a given area of the conveyor thereof.

Still another object of this invention is to provide a produce sizer constructed in accordance with the preceeding objects and which may have various types of endless conveyor assemblies mounted thereon in order that the configuration of the individual cross members and the spacing between adjacent cross members of each endless conveyor may be readily varied to further increase the adaptability of the produce sizer to handle various types of produce.

A final object of this invention to be specifically enumerated herein is to provide a produce sizer in accordance with the preceding objects which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a fragmentary transverse vertical sectional view taken substantially upon the plane indicated by the section line 4—4 of FIGURE 3;

FIGURES 7 and 8 are fragmentary top plan views of two modified forms of conveyor cross members which may be used as replacements for the cross members illustrated in FIGURES 1–5;

FIGURE 9 is a fragmentary side elevational view of another form of the invention illustrating vertical adjustment of both conveyor reaches;

FIGURE 11 is a sectional view taken as on line 11—11 in FIGURE 9; and

FIGURE 12 is a fragmentary vertical sectional view showing the details of one of the lower conveyor support members.

Figure 1:
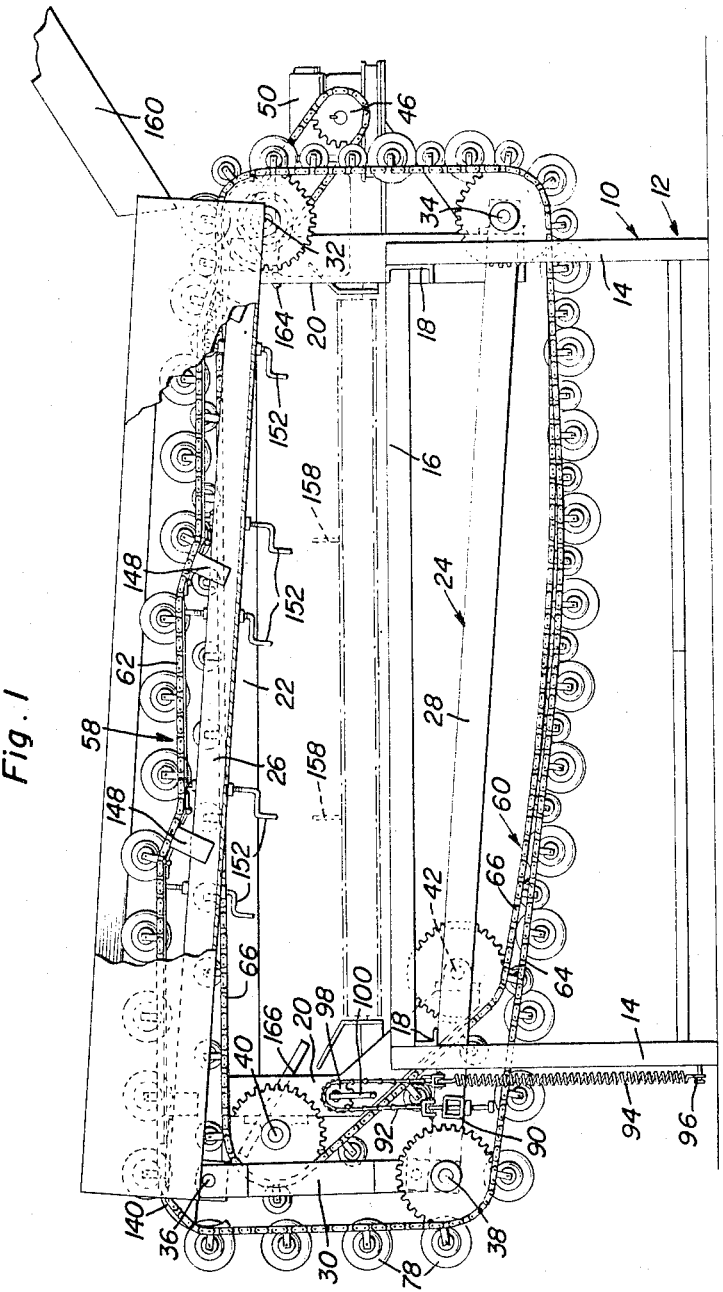
FIGURE 1 is a side elevational view of the produce sizer of the instant invention with parts being broken away and shown in section to more clearly illustrate the structural details thereof and with an associated transversely extending bagging conveyor illustrated in phantom lines.

Referring now more specifically to the drawings the numeral 10 generally designates the produce sizer of the instant invention which may be seen to include a main frame generally referred to by the reference numeral 12 having four upstanding legs 14 interconnected by means of two upper longitudinal and opposite side brace members 16 and a pair of upper transverse opposite end brace members 18. The main frame 12 includes four extension uprights 20 secured at their lower ends to the legs 14 and interconected at their upper ends by means of a pair of longitudinal brace members 22.

A swingable frame generally referred to by the reference numeral 24 is provided and includes a pair of opposite side sections which each include a pair of upper and lower longitudinal frame portions 26 and 28 and a vertical frame portion 30. The main crank 12 has a drive shaft 32 and an idler shaft 34 journaled thereon by means of suitable bearing blocks and corresponding ends of the frame portions 26 and 28 are rotatably mounted from the shafts 32 and 34, respectively, with the frame portions 26 being disposed outwardly of the brace members 22 and the frame portions 28 being disposed inwardly of the legs 14.

The vertical frame portions 30 are pivotally secured at their upper and lower ends to the free ends of the frame portions 26 and 28 by means of pivot pins 36 and shaft 38, respectively. Accordingly, it may be seen that the free end of the swingable frame 24 may be adjusted vertically as desired to vary the inclination of the frame portions 26 thereof relative to the corresponding brace members 22 which rigidly interconnect the opposite end extension uprights 20.

A third idler shaft 40 is journaled between the extension uprights 20 adjacent the vertical frame portion 30 and a fourth idler shaft 42 is journaled between the inwardly inclined lower ends of the same extension uprights 20. Each of the idler shafts 34, 38, 40 and 42 as well as the drive shaft 32 has a pair of sprocket wheels mounted on its opposite ends for rotation therewith. In addition, the drive shaft 32 also has a driven sprocket wheel 44 mounted thereon aligned with a driving sprocket 46 mounted upon the output shaft 48 of a transmission assembly 50 driven by means of an electric motor 52. The driving sprocket 46 is drivingly coupled to the driven sprocket 44 by means of an endless chain 54.

The produce sizer 10 includes a pair of endless flexible conveyor assemblies generally referred to by the reference numerals 58 and 60. The conveyor assembly 58 includes a pair of endless chains 62 and 64 which are entrained over the gear wheels secured to the shafts 32, 34 and 38. The driving and idler shafts 32 and 34 each also have a second pair of sprocket wheels mounted thereon for rotation therewith and the pair of endless chains 66 and 68 which form a part of the conveyor assembly 60 are entrained over the second pair of sprocket wheels mounted on the drive and idler shafts 32 and 34 and the sprocket wheels mounted on the shafts 40 and 42.

Figure 3:
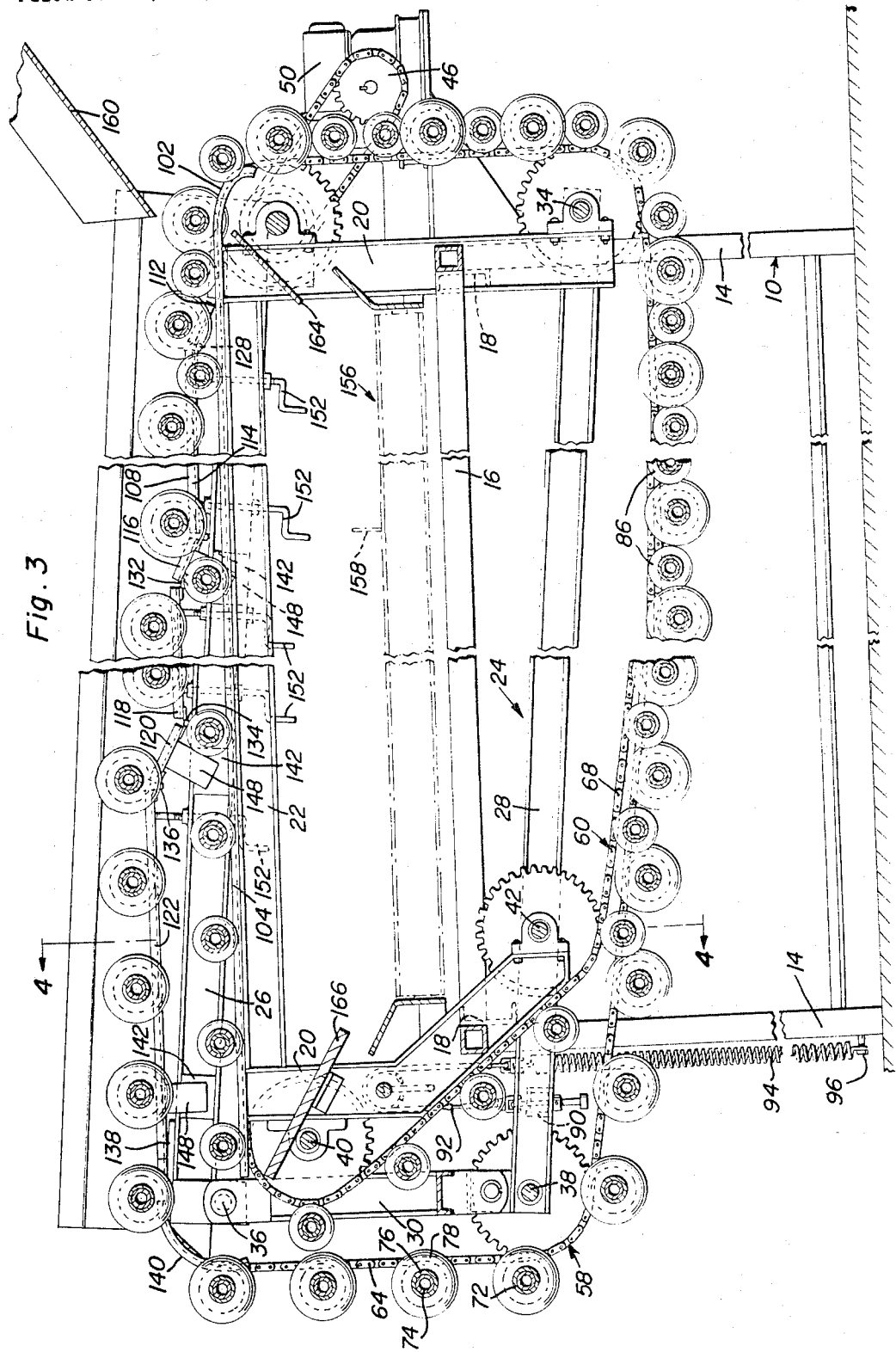
FIGURE 3 is a fragmentary enlarged longitudinal vertical sectional view taken substantially on the plane indicated by the section line 3—3 of FIGURE 2 and with sections thereof being broken away.

It may be observed that the two pairs of sprocket wheels on the drive shaft 32 are of the same diameter and therefore that the conveyor assemblies 58 and 60 will move at the same speed. Further, it may be observed from FIGURES 1 and 3 of the drawings that the conveyor assembly 58 has a plurality of cross members secured between the endless chains 62 and 64 and that each cross member 72 comprises a tube 74 upon which a plurality of alternated tubular spacers 76 and disks 78 are rotatably journaled. The opposite ends of each of the tubes 74 are journaled on corresponding special links 80 of the chains 62 and 64. Each of the special links 80 comprises a pair of side straps to which the associated end of the corresponding tube 74 is rotatably secured by means of a suitable fastener 84.

Figure 2:
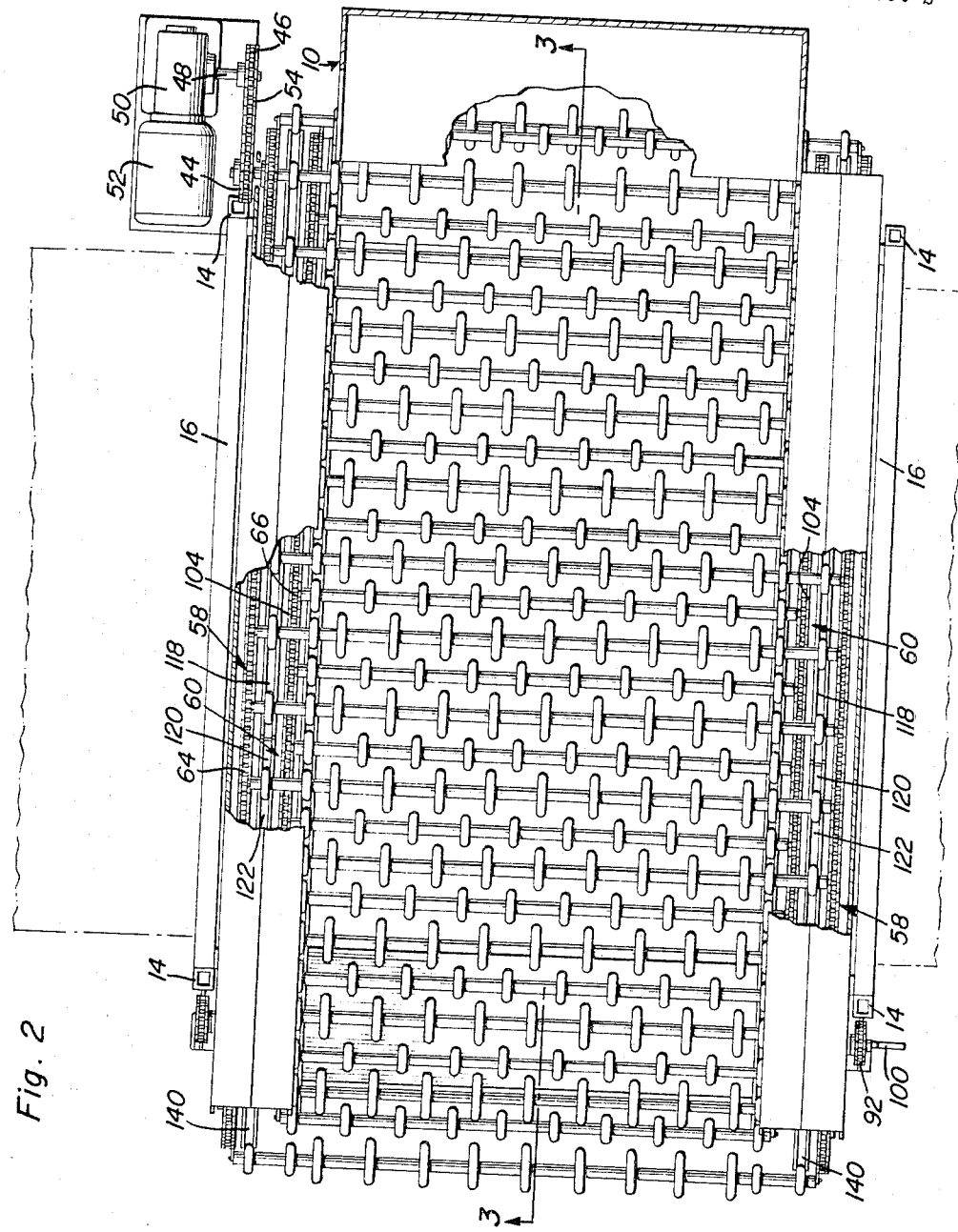
FIGURE 2 is a top plan view of the embodiment illustrated in FIGURE 2 with portions thereof being broken away and shown in section.
Figure 5:
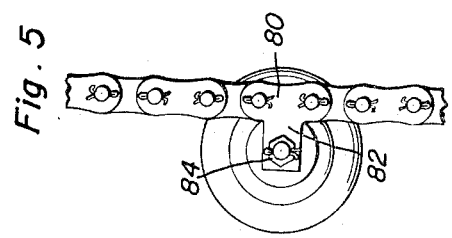
FIGURE 5 is a fragmentary enlarged side elevational view of one of the endless chains of one of the conveyors of the produce sizer shown with an associated cross member mounted thereon.

The conveyor assembly 60 is similarly constructed with the exception that its disks 86 may have a smaller diameter than the disks 78. From FIGURE 2 of the drawings it may be noted that the tubes and disks of the conveyor assemblies 58 and 60 are interdigitated.

The free swinging ends of the frame portions 28 each include a laterally and outwardly directed stub beam 90 and each stub beam 90 has one end of an elongated chain 92 secured thereto, the other end of the chain 92 being secured to the lower end of the corresponding leg 14 by means of an expansion spring 94 which is secured to the leg 14 as at 96. The chain 92 is entrained over a sprocket wheel 98 having a ratchet assembly (not shown) operatively associated therewith. The spring 94 functions as a counterbalance for the free end of the swinging frame 24 and each spring 94 will exert a 300 pound lifting force on the free end of the swinging frame 24 when elongated three inches beyond its normal length.

In this manner, it may be seen that the crank 100 operatively associated with the sprocket wheel 98 may be readily swung so as to vary the inclination of the frame portion 26 relative to the brace members 22.

With attention now directed more specifically to FIGURES 1, 3 and 6–7 of the drawings, it may be seen that first guide means 104 in the form of an elongated upwardly opening channel member is secured to the top of each brace member 22 and that the approach end of each channel member 104 is downwardly curved as at 106 for receiving the opposite end disks of the cross members of the conveyor assemblies 58 and 60. The disks 86 carried by the opposite ends of the conveyor assembly 60 are spaced inwardly of the disks 78 and engage the downwardly curving approach end 102 of each channel member 104 whereupon the upper horizontal run or reach of the conveyor assembly 60 is supported by the channel members 104 for substantially straight line movement.

The cross members 72 are longer than the cross members of the conveyor assembly 60 and the disks 78 carried by the opposite ends thereof are rollingly engaged with second guide means 108 which are supported from the frame portions 26. With attention directed now more specifically to FIGURES 3 and 6 of the drawings it may be seen that the second guide means 108 comprises a pair of sets of a plurality of elongated track members 110, 112, 114, 116, 118, 120, and 122.

Figure 6:
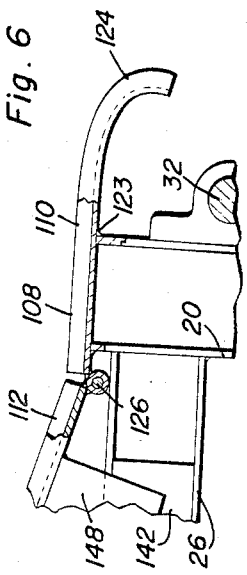
FIGURE 6 is a fragmentary enlarged longitudinal vertical sectional view illustrating the manner in which one end of one of the guide rails for the vertically adjustable conveyor is fixedly secured to the inlet end of the swingable portion of the conveyor frame.

Each of the track members of each of the guide means 108 defines an upwardly opening channel for receiving the corresponding disk 78 and it may be seen from FIGURE 6 of the drawings that the track member 110 is fixedly secured by welding 123 to the upper end of the extension upright 20. The approach end of the track member 110 is curved downwardly as at 124 and the opposite end thereof is pivotally secured to the track member 112 by means of a hinge connection 126. The remote end of the track section 112 is pivotally secured to the adjacent end of the track section 114 by means of a hinge connection 128 while the corresponding end of the track section 114 is secured to the adjacent end of the track section 116 by means of a hinge connection 130. Similarly, a hinge connection 132 joins the adjacent ends of the sections 116 and 118 while hinge connections 134 and 136 pivotally join the adjacent ends of the track members 118 and 120 and the track members 120 and 122, respectively.

The free end of the track member 122 rests upon a wear plate 138 secured to the upper surface of the free end of the frame portion 26 and is aligned with a fixedly mounted curved track member 140 with which the disks 78 are also engageable for guiding the conveyor assembly 58 in the upper horizontal reach thereof to the vertical reach thereof disposed at the free swinging end of the swinging frame 24.

The frame portions 26 are channel-shaped in cross-section and have bearing or filler plates 142 secured thereto for forming a pair of oppositely facing bearing surfaces on opposite sides of the frame portion 26 at points spaced longitudinally therealong. The free end of each track member 116, 120 and 122 is provided with a pair of depending and generally parallel guide plates 148 defining, together with the adjacent portion of the corresponding frame portion 26, short longitudinally spaced downwardly opening channel portions embracingly engaging corresponding portions of the frame portions 26. In this manner, while the approach end of the guide means 108 is fixed to the extension uprights 20, the intermediate portions and free ends thereof include means preventing horizontal lateral shifting of the various track members relative to the frame portions 26.

The frame portions 26 each have a plurality of height adjusting screw members threadably supported therefrom and each screw member 152 includes a crank portion whereby it may be readily rotated. The screw shaft portions of the screw members 152 are threadably engaged with the corresponding frame portion 26 and project upwardly therefrom for abutting engagement with the undersurfaces of the opposite ends of the track members 114, and 118 and the adjacent end of the track member 122.

The upper terminal ends of the screw members 152 are smooth and abuttingly engage the undersurface of the corresponding track members. In this manner, as the screw members 152 are adjusted, the track members with which they are engaged may shift longitudinally of the frame portion 26 and the free end of the track members 122 may slide along the upper surface of the wear plate 138.

The space between the brace members 16 and the brace members 22 defines a transversely extending passage through the upper portion of the main frame 12 and an elongated packaging conveyor generally referred to by the reference numeral 156 extends longitudinally through this passage for the reception of produce falling between adjacent ones of the cross members of the conveyor assemblies 58 and 60 passing along the upper reaches thereof. The bagging conveyor 156 may include one or more upstanding faces 158 whereby the produce falling through between the cross members of the conveyor assemblies 58 and 60 may be maintained in their proper size group while being conveyed to a bagging point. A loading chute 160 may be provided and have its outlet end positioned adjacent the inlet end of the upper runs of the conveyor assemblies 58 and 60 for conveying the produce which is to be sized to the sizer 10.

In operation, the electric motor 52 may be actuated to drive the conveyors 58 and 60 of the sizer 10 whereupon produce being discharged from the chute 160 will be sized. The smaller articles of produce will fall between the adjacent cross members of the conveyor assemblies 58 and 60 in the area of the track members 108. Then, as the produce moves into the area adjacent the track members 118 wherein the adjacent cross members of the conveyor assemblies 58 and 60 are spaced further apart, larger articles of produce will fall down through the conveyor assemblies 58 and 60 and onto the bagging conveyor 156. Finally, the largest articles of produce will fall between the adjacent cross members in the area of the track members 122. The track members 122 support the cross members of the conveyor assembly 58 at their maximum distance from the cross members of the lower conveyor assembly 60. It should be noted that the combination conveyor assembly need not be two separate conveyor assemblies but may include alternate cross members which are vertically adjustable, several types of these conveyor assemblies being commercially available.

The sizer 10 includes a pair of deflector panels 164 and 166 for deflecting the sized produce at the opposite ends of the frame 12 downwardly onto the bagging conveyor 156. In addition, the cross members of the conveyor assemblies 58 and 60 disclosed in FIGURES 1-5 may be replaced by various types of cross members such as those indicated at 166 and 168 in FIGURES 7 and 8.

Should the produce sizer 10 be utilized to size a different type of produce, the cross members thereof would probably be changed for cross members specifically designed to handle the new produce to be sized. Further, the spacing between adjacent cross members of each conveyor assembly 58 and 60 may be varied and the various gear wheels of the sizer may be changed to handle different types of chains. It will be noted that the gear wheels are disposed on the outermost ends of the supporting shafts and that the sizer is constructed in a manner whereby these gear wheels may be readily replaced. It would therefore also follow that the endless chains from which the conveyor assemblies 58 and 60 are constructed may also be readily changed.

Further, the sizer 10 may be readily adjusted by means of the adjusting screws 152 to vary the distance between the track members 108, 118 and 122 and the corresponding track members of the channel member 104. In this manner, the particular size grouping of produce may be discharged from each section of the sizer 10 and it will further be noted that the spacing between adjacent ones of the cross members of the conveyor assemblies 58 and 60 may also be obtained by vertically adjusting the free swinging end of the swing frame 24.

It is to be understood that the disks 78 and 86 carried by the opposite ends of the corresponding tubes rollingly engage their respective guide means and that they, and the other disks 78 and 86 are fixed to the associate tube for rotation therewith. In this manner the produce to be sized is rotated and cradled between adjacent ones of said tubes and is therefore sized in a more precise manner. Further, although the disks 78 and 86 are illustrated and described as being of different sizes, in some instances it is advantageous to have the disks of the same size in order that the tubes between which produce is cradled may have the same peripheral speed as they are rotated.

The two conveyor assemblies 58 and 60, by means of their respective guide means may have their upper reaches arranged in parallel sections disposed at varied distances from each other or the stepped sections of the uppermost conveyor assembly may be inclined relative to the corresponding portions of the other conveyor assembly. Further, both guide means 104 and 108 may comprise a plurality of longitudinally aligned and independently adjustable track members.

Figure 10:
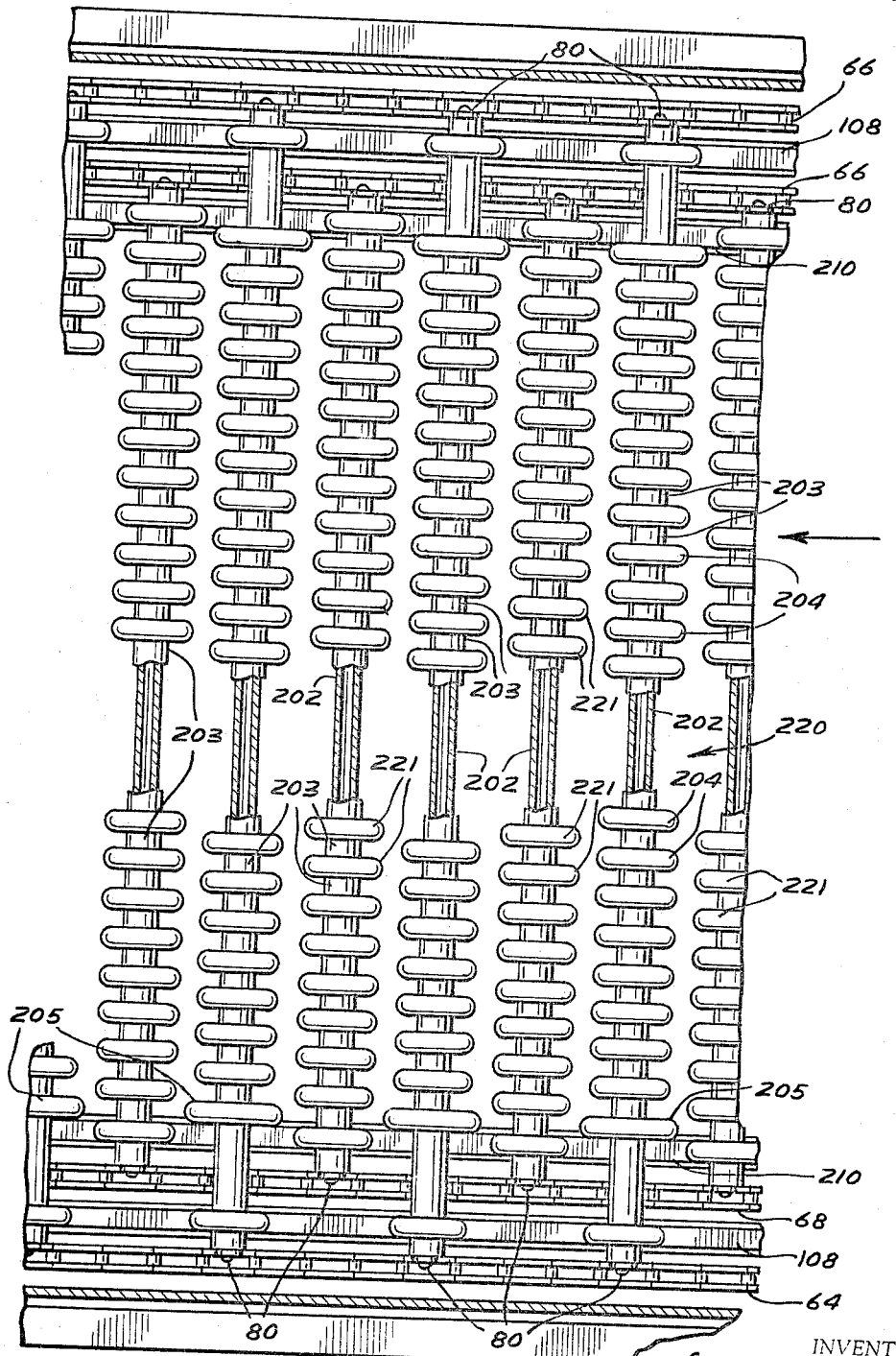
FIGURE 10 is a fragmentary top plan view of the device of FIGURE 9.

FIGURES 9–11 show the second embodiment of the invention constructed in substantially the same way as the embodiment described above. Parts or elements which are common to both embodiments are designated with the same numerals, and since they have been fully described above, they will not be described in great detail. Essentially, the difference between the present form of the invention and that of the first embodiment is that the present embodiment provides upper and lower conveyor assemblies which are both vertically adjustable with respect to the frame. In this manner, it is possible to diverge the cross members of both conveyors at the same point of travel. This serves two primary purposes. First, it provides a means for maintaining the cross members in their interdigitated relation, irrespective of the amount of vertical adjustment that is made, i.e., as the top cross members are moved upwardly, the lower cross members can be correspondingly adjusted downwardly so as to maintain the interdigitated relationship. Secondly, by adjusting both conveyor assemblies, it is possible to achieve a more abrupt change of the vertical spacing therebetween. Accordingly, a greater variance is achieved between the articles of produce within each size grouping.

In this form of the invention the upper conveyor assembly 58 is shown having a plurality of cross members, generally designated 201, which are secured between the endless chains 62 and 64. Each cross member comprises a tubular inner shaft 202, spacers 203 and disks 204. Similarly, the lower conveyor assembly 60 is provided with a plurality of cross members 220 secured between the endless chains 66 and 68 and each of the cross members comprises a tubular inner shaft 202, spacers 203 and disks 221. The disks 221 provided on the lower conveyor assembly are preferably the same size as the disks 204 on the upper conveyor assembly 58. At the opposite ends of each of the tubes 202 are situated the special links 80 in a manner as described above in conjunction with the first embodiment. Further provided are the end disks 205 located adjacent the upper conveyor assembly 58. These end disks are provided to prevent produce from falling off the side edges of the conveyor.

The guide means for the lower conveyor assembly 60 is comprised as a channel shaped track 210 that is made up of a plurality of sections 211, 212, 213, 214, 215, 216, and 217. The track section 211 has a hinge 222 mounted thereon at the remote end thereof and this hinge in turn is attached to the entrance end of the track section 212. The track section 212 in turn is hingedly connected to the track section 213 with hinge 223. Track section 213 in turn is hingedly connected with a hinge 224 to the short track section 214 which is connected with a hinge 225 to the track section 215. Likewise, the track section 215 is connected with a hinge 226 to the track section 216 which is connected in turn with a hinge 227 to the track section 217. The track sections of the channel shaped member 210 now correspond in arrangement and position to the track members 110, 112, 114, 116, 118, 120 and 122 of the upper guide means 108.

Track sections 213, 215 and 217 on the lower guide means are supported with respect to the brace member 22 of the frame by eccentrically mounted disc cams 230. The disc cams are mounted by bolts 231 and are rotatable about the axis of the bolts 231 to enable adjustment of the height of the uppermost edge thereof and consequently adjust the height of the track members 213, 215 and 217.

Suitable guides 232 can be provided to hold the track members in place above the brace member 22 of the frame. These guides correspond to the guides 148 provided in conjunction with the upper track members. Thus it can be seen that the lower guide means 210 can shift longitudinally with respect to the brace 22, but are prevented from lateral shifting; and each of the track members is provided with these guides to prevent this lateral shifting.

The height adjusting screw members 152 are again utilized for adjusting the upper track members relative to the frame 26. Height adjusting screws could also be used in place of the cams for adjusting the lower track members; the screws would be threadably mounted in the frame member 22 and their upper ends would abut against the bottom surfaces of the lower tracks.

There is thus provided means for adjusting the vertical height of the lower track members and thereby permit the same to diverge downwardly at the same point in travel as the tracks of the upper conveyor assembly 58. Accordingly, the registry of the interdigitated cross members 220 and 201 are kept in precise alignment. When only the upper conveyor is diverged, the cross members on the upper conveyor assembly will get slightly out of registry with the exact center between adjacent cross members of the lower conveyor. Of course, as the amount of divergence is increased, this misalignment becomes more significant, and, accordingly, errors in grading arise. By the provision of means for vertically adjusting both conveyor assemblies, this problem is virtually eliminated.

A second advantage is that the transistion track sections 212, 214, 216 and their corresponding members on the upper guide means can be shorter and still obtain the same amount of vertical spacing between the cross members. This means for a given size bed that the parallel portions of the sizing conveyors will be longer, with less space wasted in the transition sections.

It should be pointed out that the cross members 201 and 220 rotate in a manner identical to the cross members of the first form of the invention so that the produce will be rotated as it is carried along the bed in order to size the minimum dimension of each article of produce. Also, in the second form of the invention the disks 204 and 221 are spaced somewhat closer together whereby better control of the sizing is obtained. For example, the spacing between the disks 204 is less than that between the peripheral edge of each of the upper disks 204 and its most closely adjacent disk 221 situated on the lower cross members. Accordingly, the produce being sized will only drop through the two conveyor assemblies when the vertical spacing therebetween is sufficient to permit this passage.

It is apparent that many changes and variations of the above described invention can be made without departing from the spirit and scope of the appended claims.

What is claimed is:

1. In a conveying and sizing machine for produce,
   (a) a frame,
   (b) top and bottom conveyor assemblies each having a plurality of spaced cross members, the cross members of said top conveyor assembly being normally interdigitated with respect to said cross members of said bottom conveyor assembly,
   (c) conveyor support means including two sets of a plurality of track members, the track members being aligned end to end and pivotally interconnected for supporting each of said conveyor assemblies for travel in a closed path, said paths having a portion thereof adapted to convey produce thereon, and
   (d) means associated with each set of said track members for adjusting the vertical positioning thereof relative to said frame to thereby permit both paths of travel of said conveyor assemblies to be adjusted vertically relative to said frame.

2. In a conveying and sizing machine for produce,
   (a) a frame,
   (b) top and bottom conveyor assemblies each having a plurality of spaced cross members, the cross members of said top conveyor assembly being normally interdigitated with respect to said cross members of said bottom conveyor assembly,
   (c) conveyor support means including two sets of tracks formed a plurality of interconnected upwardly extending channel members, said channel members being adapted to serve as guides for movement of each of said conveyor assemblies in a closed path of travel, said paths having a portion thereof adapted to convey produce thereon, and
   (d) means for vertically adjusting both sets of conveyor support means relative to each other whereby said top and bottom conveyor assemblies can be diverged relative to one another at the same point of travel and thereby maintain the cross members of said conveyor assemblies in their normally interdigitated relation.

3. The combination as specified in claim 2 wherein said frame and certain of said channel members include coacting guide means engaged with each other and allowing vertical and horizontal shifting of said channel members in upstanding planes extending longitudinally but preventing horizontal lateral shifing of said certain channel members.

4. In a conveying and sizing machine for produce,
   (a) a frame,
   (b) a pair of conveyor assemblies each having a plurality of spaced cross members, the cross members of a first conveyor assembly being normally interdigitated with respect to said cross members of a second conveyor assembly, (c) conveyor support means carried by said frame for supporting each of said conveyor assemblies for movement in a closed path, said paths having a portion thereof adapted to convey produce thereon as they move, (d) means to move said conveyor assemblies in a closed path, (e) said support means comprising sets of elongated track members forming conveyor supports having conveyor support planes starting on a common line at the approach end of the conveyors and diverging in direction of normal conveyor movement to form upper and lower sets, (f) a swingable subframe pivotally mounted to said frame adjacent the approach end of the conveyor about a substantially horizontal, transverse axis, the upper set of said track members being carried by the swingable subframe, and (g) means adjustably vertically supporting said subframe adjacent the departure end of said guide means relative to the frame.

5. In a conveying and sizing machine for produce, a frame, an endless conveyor comprising a pair of opposite side endless member means and two sets of spaced interdigitated cross members interconnecting said opposite side endless member means, means supporting said conveyor from said frame for travel in a closed path having at least a portion thereof disposed in a generally horizontally disposed run adapted to convey produce thereon, said frame including first guide means engageable with one set of said cross members for guiding the latter while in said run for movement in a generally straight line said endless conveyor including means mounting the other set of cross members in said run for vertical movement relative to said one set of cross members, elongated adjustable second guide means carried by said frame, extending longitudinally of said run and engaged with and vertically adjustably supporting said other set of cross members in said run, said frame including a pair of generally horizontally frame portions extending along said run and underlying the opposite ends of the other set of cross members in said run, said frame portions adjacent the approach end of said guide means being pivotally supported from said frame for rotation about generally horizontal axes extending transversely of said run, means adjustably vertically supporting said frame portions adjacent the departure end of said guide means relative to said frame, said second guide means including a pair of sets of a plurality of elongated track members, the track members of each set being aligned end to end and pivotally secured together for rotation about transversely extending generally horizontal axes, means pivotally securing the free end of the track member of each set at the approach end of said guide means to said frame for pivotal movement about a horizontal axis extending transversely of said run, and adjustable elevating means carried by said frame and engageable with at least some of said track members of each set thereof intermediate the opposite ends of said guide means for adjustably vertically supporting said same track members, the free ends of the track member of each set of track members at the approach end of said guide means being secured to the corresponding ends of said frame portions, the free ends of the remote track members of each set of track members being slidingly supported from the corresponding ends of said frame portions for movement longitudinally therealong.

6. The combination of claim 5 wherein said frame portions are beam-like in configuration and extend longitudinally of said run, said frame and certain of said track members including coacting guide means engaged with each other and allowing vertical and horizontal shifting of said certain track members in upstanding places extending longitudinally of said run but preventing horizontal lateral shifting of said certain track members.

7. In a conveying and sizing machine for produce including a frame supporting first elongated conveyor means including at least a portion disposed in a substantially horizontal run for movement along said run and including first spaced transversely extending horizontal members, second elongated conveyor means including at least a portion disposed in said run and including second spaced transversely extending horizontal members interdigitated with said first transversely extending members and supported from said frame for movement along said run with and vertical adjustment relative to said first members, elongated adjustable guide means carried by said frame extending longitudinally of said run, and engaged with and vertically adjustably supporting said second cross members, said frame including a pair of generally horizontal frame portions extending along said run and underlying the opposite ends of said second cross members, said frame portions adjacent the approach end of said guide means being pivotally supported from said frame for rotation about generally horizontal axes extending transversely of said run, means adjustably vertically supporting said frame portions adjacent the departure end of said guide means relative to said frame, said guide means including a pair of sets of a plurality of elongated track mmebers, the track members of each set being aligned end to end and pivotally secured together for rotation about transversely extending axes, means pivotally securing the free end of the track member of each set at the approach end of asid guide means to said frame for pivotal movement about a horizontal axis extending transversely of said run, and adjustable elevating means carried by said frame and engageable with at least one of said track members of each set thereof intermediate the opposite ends of said guide means for adjustably vertically supporting said same track members, the free ends of the track members of each set of track members at the approach end of said guide means being secured to the corresponding ends of said frame portions, the free ends of the remote track members of each set of track members being slidingly supported from the corresponding ends of said frame portions for movement longitudinally therealong.

8. The combination of claim 7 wherein said frame portions are beam-like in configuration and extend longitudinally of said run, said frame and certain of said track members including coacting guide means engaged with each other and allowing vertical and horizontal shifting of said certain track members in upstanding planes extending longitudinally of said run but preventing horizontal lateral shifting of said certain track members.

9. In a conveying and sizing machine for produce including a frame supporting first elongated conveyor means including at least a portion disposed in a substantially horizontal run for movement along said run and including first spaced transversely extending horizontal members, second elongated conveyor means including at least a portion disposed in said run and including second spaced transversely extending horizontal members interdigitated with said first transversely extending members and support from said frame for movement along said run with and vertical adjustment relative to said first members, elongated adjustable guide means carried by said frame extending longitudinally of said run, and engaged with and vertically adjustably supporting said second cross members, said frame including a pair of generally horizontal frame portions extending along said run and underlying the opposite ends of said second cross members, said guide means including a pair of sets of a plurality of elongated track members, the track members of each set being aligned end to end and pivotally secured together for rotation about transversely extending axes, said frame portions adjacent said approach end of said guide means being pivotally supported from said frame for rotation about generally horizontal axes extending transversely of said run, and means adjustably vertically supporting said frame portions adjacent the departure end of said guide means relative to said frame, said frame portions being beam-like in configuration and extending longitudinally of said run, said frame and certain of said track members including coacting guide means engaged with each other and allowing vertical and horizontal shifting of said certain track members in upstanding planes extending longitudinally of said run but preventing horizontal lateral shifting of said certain track members.

10. In a conveying and sizing machine for produce,
(a) a frame,
(b) top and bottom conveyor assemblies each having side endless members and a plurality of spaced cross members between the endless members, the cross members of said top conveyor assembly being normally interdigitated with respect to said cross members of said bottom conveyor assembly,
(c) upper and lower conveyor support means carried by said frame for supporting each of said conveyor assemblies for travel in a closed path, said paths having a portion thereof adapted to convey produce thereon,
(d) said support means comprising sets of elongated track members, at least the upper set of the track members comprising a plurality of alternating end to end short sections and longer sections pivotally secured together,
(e) adjustable means associated with said support means for changing the vertical distance between the conveyor assemblies only at the location of the short sections of the track, the longer sections of the upper track being substantially horizontal,
(f) a swingable subframe pivotally mounted to the frame adjacent the approach end of the conveyor assemblies, said upper set of track members being mounted on the subframe, and
(g) means adjustably vertically supporting said frame portion adjacent the departure end of said conveyor relative to said frame.

11. In a conveying and sizing machine for produce,
(a) a frame,
(b) top and bottom conveyor assemblies each having side endless members and a plurality of spaced cross members between the endless members, the cross members of said top conveyor assembly being normally interdigitated with respect to said cross members of said bottom conveyor assembly,
(c) upper and lower conveyor support means carried by said frame for supporting each of said conveyor assemblies for travel in a closed path, said paths having a portion thereof adapted to conveyor produce thereon,
(d) said support means comprising sets of elongated track members, both of the sets comprising a plurality of alternating end to end short sections and longer sections pivotally secured together, and
(e) adjustable means associated with said support means for changing the vertical distance between the conveyor assemblies only at the short sections of the track, the longer sections of the track being substantially horizontal, and each of the sets diverging the same distance from a substantially horizontal bisecting plane and at the same point of travel.

References Cited by the Examiner
UNITED STATES PATENTS

| | | | |
|---|---|---|---|
| 2,526,161 | 10/1950 | Sammis et al. | 209—102 |
| 2,645,342 | 7/1953 | Roberts | 209—102 |
| 2,917,170 | 12/1959 | Flodin | 209—84 X |
| 3,038,605 | 6/1962 | Durand | 209—102 |

FOREIGN PATENTS

| | | |
|---|---|---|
| 1,053,203 | 9/1953 | France. |
| 1,105,584 | 7/1955 | France. |
| 730,029 | 5/1955 | Great Britain. |

ROBERT B. REEVES, *Primary Examiner.*

UNITED STATES PATENT OFFICE
CERTIFICATE OF CORRECTION

Patent No. 3,278,024                                    October 11, 1966

Arden Burbidge et al.

It is hereby certified that error appears in the above numbered patent requiring correction and that the said Letters Patent should read as corrected below.

Column 1, line 40, before "sizes" insert -- sections may be utilized to collect the various individual --; column 3, line 23, for "interconected" read -- interconnected --; column 12, line 14, for "conveyor" read -- convey --.

Signed and sealed this 22nd day of August 1967.

(SEAL)
Attest:

ERNEST W. SWIDER                                EDWARD J. BRENNER
Attesting Officer                                    Commissioner of Patents